May 30, 1933.   C. W. VAN RANST   1,911,214
UNIVERSAL JOINT
Filed Aug. 22, 1928   3 Sheets-Sheet 2

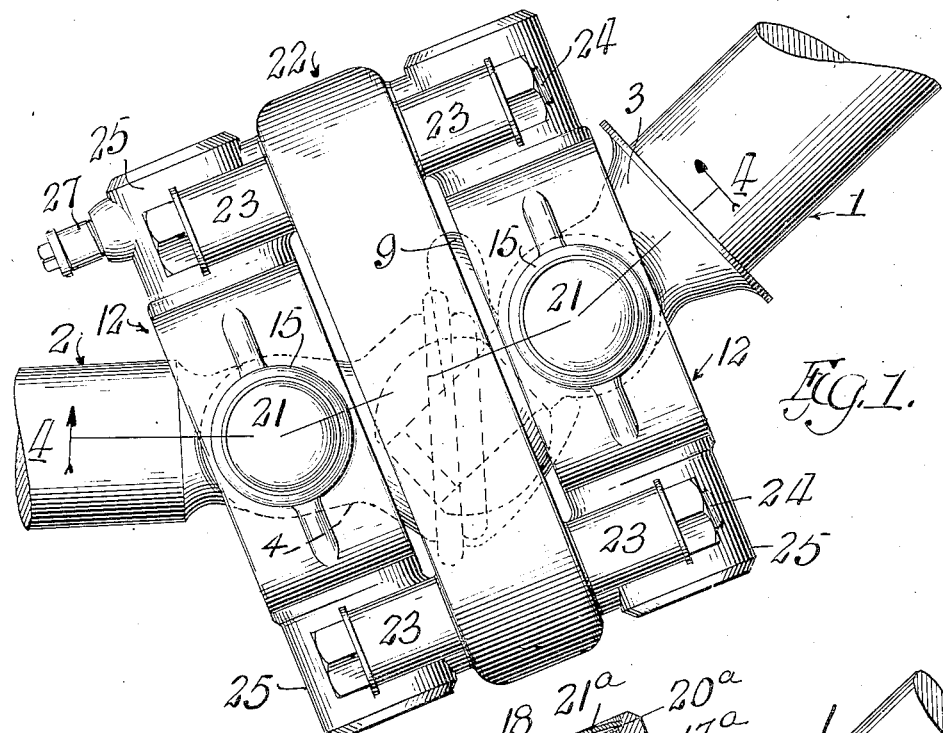
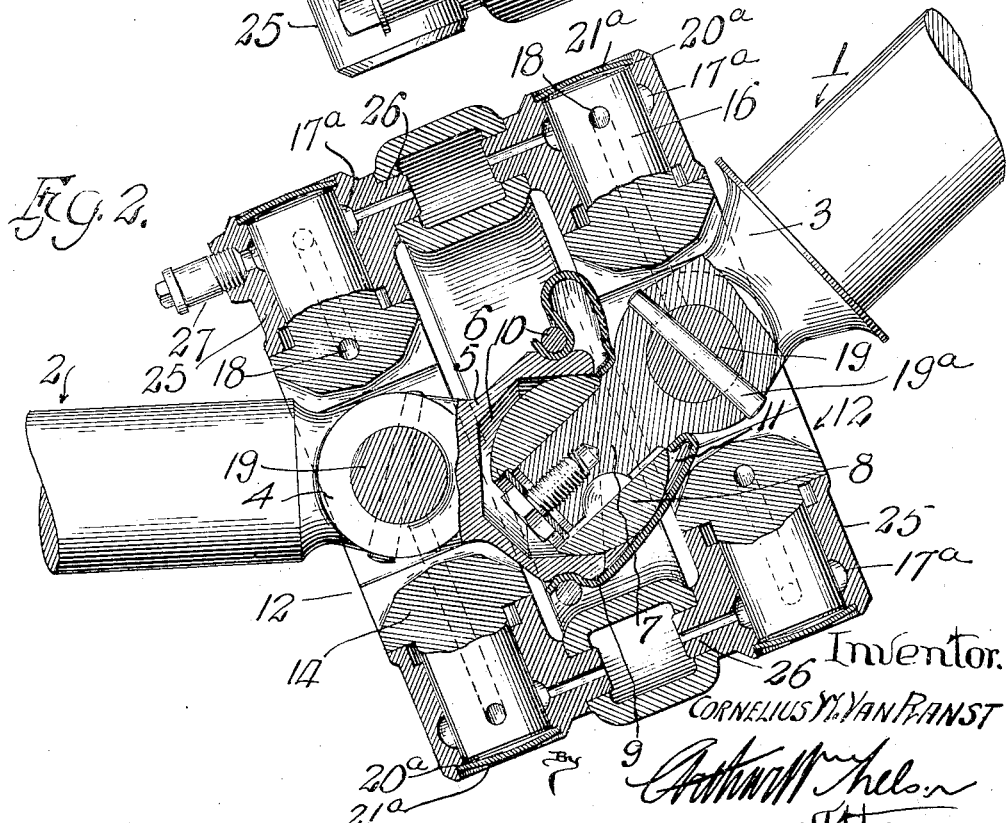

Inventor.
CORNELIUS W. VAN RANST
By Arthur W. Thelen
Attorney.

May 30, 1933.  C. W. VAN RANST  1,911,214
UNIVERSAL JOINT
Filed Aug. 22, 1928  3 Sheets-Sheet 3
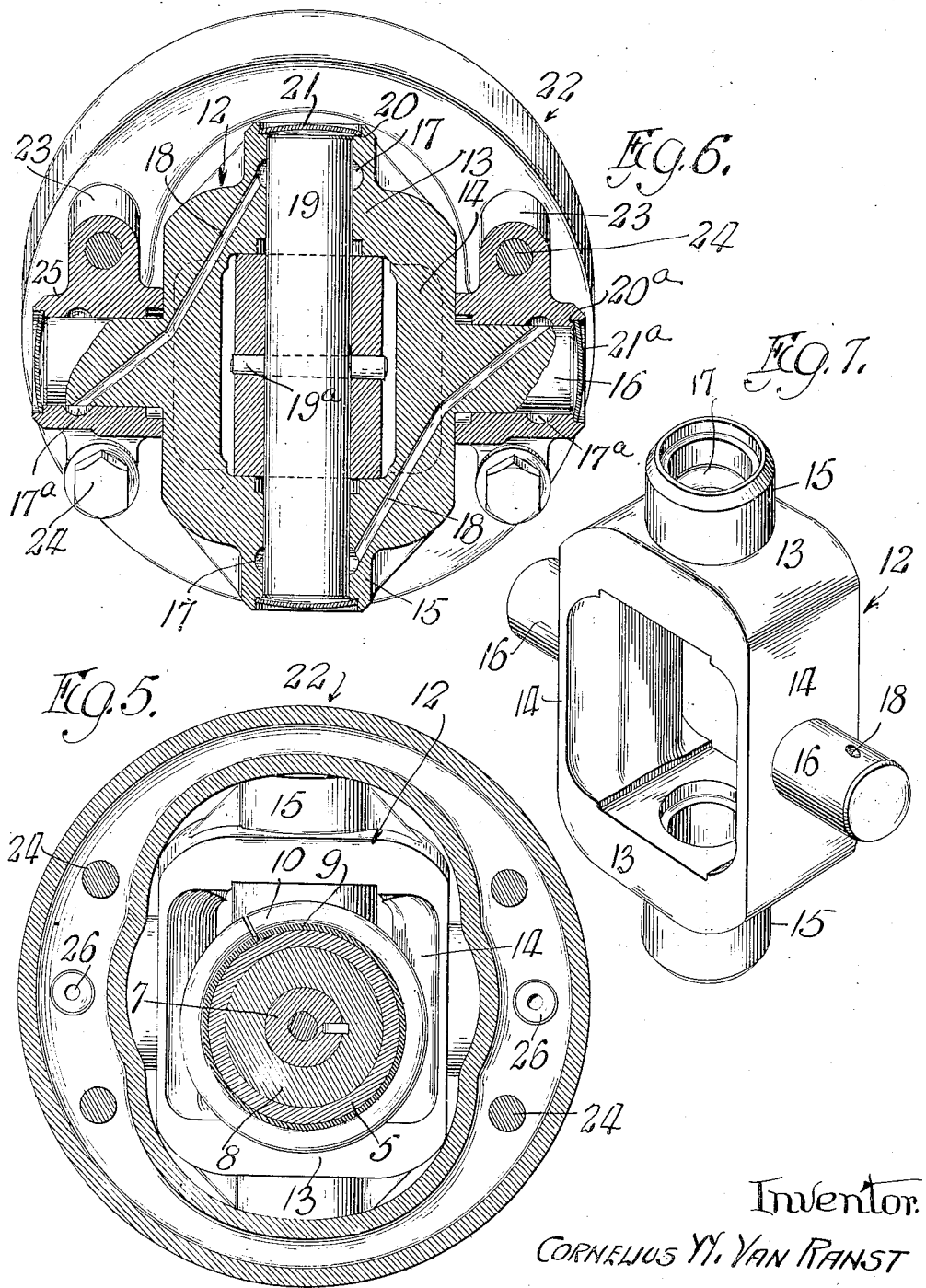
Inventor.
CORNELIUS W. VAN RANST
By Arthur W. Nelson
Attorney.

Patented May 30, 1933

1,911,214

UNITED STATES PATENT OFFICE

CORNELIUS W. VAN RANST, OF INDIANAPOLIS, INDIANA, ASSIGNOR, BY MESNE ASSIGNMENTS, TO MANNING & CO., OF CHICAGO, ILLINOIS, A CORPORATION OF ILLINOIS

UNIVERSAL JOINT

Application filed August 22, 1928. Serial No. 301,288.

This invention relates to improvements in universal joints and it consists of the matters hereinafter described and more particularly pointed out in the appended claims.

The primary object of the invention is to provide a universal joint structure whereby greater relative angularity between associated shaft sections may be attained without appreciable loss in driving power therebetween.

A further object of the invention is to provide a structure of this kind which may be said to be duplex in its nature to give more flexibility and one wherein the central connecting member is employed as the reservoir for a lubricant, whereby the relatively movable parts which are connected thereto by ducts are maintained properly lubricated and the wear thereon is reduced to a minimum.

These objects of the invention as well as others, together with the many advantages thereof, will more fully appear as I proceed with my specification.

In the drawings:—

Fig. 1 is a view in side elevation of a universal joint structure embodying my invention.

Fig. 2 is a longitudinal sectional view therethrough as taken on the line 2—2 of Fig. 3 but with the parts in the position they occupy in Fig. 1.

Figure 4:
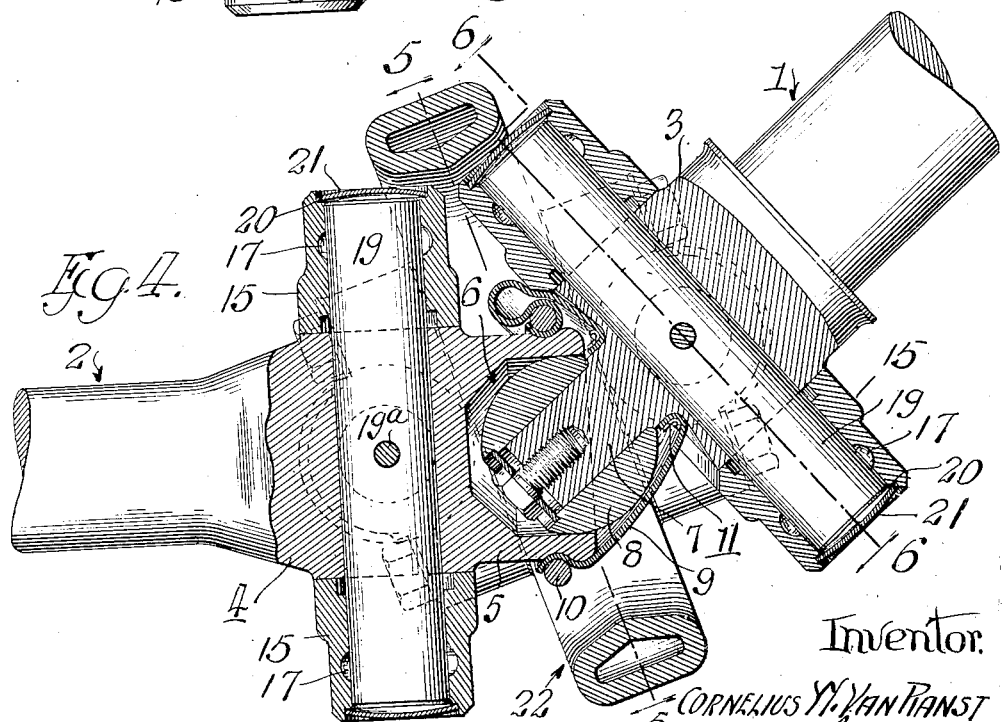
Fig. 4 is another longitudinal sectional view as taken on the line 4—4 of Fig. 1 but with the parts in the position they occupy in Fig. 3.

Figs. 5 and 6 are transverse vertical sectional views through the joint as taken on the lines 5—5 and 6—6 respectively of Fig. 4.

Fig. 7 is a perspective view of one of a pair of yokes embodied in my improved universal joint.

In general my improved universal joint, of course, contemplates the connection with a driving relation between driving and driven shaft sections. The adjacent extremities of said shaft sections have interengaging ball and socket parts about which the angular displacement between said shaft sections takes place. Each end of each shaft section is formed to provide a bearing for an associated yoke which is capable of a pivotal movement about a pintle passing transversely through the associated shaft end. Each yoke includes a pair of trunnions disposed at a right angle to the associated pintle and these trunnions bear in blocks on a central connecting ring. This ring is made hollow to hold a lubricant and ducts and grooves are provided whereby lubricant may pass from said hollow ring to said pintles and trunnions so that wear thereon is reduced to a minimum.

Referring now in detail to that embodiment of the invention illustrated in the accompanying drawings:—1 and 2 indicate driving and driven shaft sections respectively, which it is desired to connect together by my improved joint construction. Each shaft section includes a head 3 and 4 respectively of rectangular cross section when the same is considered transversely and on the head 4 coaxially with the associated shaft is a hollow extension 5 with a socket 6 therein. On the head 3 is formed an axially arranged extension 7 to which is fixed a ball 8 that fits in the socket 6 which ball and socket provide the axis about which the shaft sections may swing into different relative angular positions.

The ball and socket connection just mentioned is enclosed by a flexible cover 9 of leather or the like, which is fixed at its ends to the associated extensions 5 and 7 respectively as by the rings 10 and 11 respectively as best shown in Figs. 2 and 4.

Associated with each shaft head is an open block like yoke or frame 12, one of which is best shown in perspective in Fig. 7. Said yoke comprises top and bottom walls 13—13 and side walls 14—14 and integral with each wall 13 is a tubular stud 15 while integral with each wall 14 is a solid trunnion 16, said studs and trunnions being disposed at right angles to each other. In each hollow stud is provided an annular groove 17 with which is connected a duct 18 that opens laterally through one of the trunnions 16. The opposed inner surfaces of the walls 13—13 of the yoke are made flat to bear upon like surfaces of the heads 3—4 of the associated shaft sections, while the opposed inner surfaces of the walls 14—14 are cut away as best shown in Fig. 2 to provide the necessary clearance when the yoke stands at less than a right angle to the plane of its associated shaft section.

Each yoke is operatively connected to its associated shaft section by a pintle 19 of substantial diameter. Said pintle engages at its mid portion in and is fixed by a pin 19ª to the shaft section head and bears at its ends in the tubular studs 15 of said yoke. In the extremity of each tubular stud is a slightly undercut annular groove 20 in which is fixed a concaved disc 21 to close said end of the stud dust tight.

22 indicates as a whole a hollow ring, having an interior diameter which when measured in one direction is greater than the overall depth from end to end of the tubular studs on one of said yokes 12. Said ring which is substantially short in axial length when compared to its diameter has flat sides and secured to each flat side of said ring is a pair of opposed bearing blocks 23—23. The bearing blocks of each pair on one side of the ring are connected to the like blocks on the other side of the ring by bolts and nuts 24—24 which also pass through said ring to rigidly secure said blocks to said ring. Each block includes a bearing sleeve 25 and the sleeves of the blocks on one side of the ring receives the trunnions 16—16 of an associated yoke while the bearing sleeves of the blocks on the other side of the ring receives the trunnions of the other yoke. Near the outer end of each sleeve is formed an annular groove 17ª so positioned as to line up with the end of the duct 18 in said trunnion. The extremity of each sleeve is provided with a slightly undercut annular groove 20ª in which is located a concaved disc 21ª to close said end of the bearing block dust tight. Each bearing block is provided on that face engaging the sides of said ring with a tubular stud 26 which opens at one end into the groove 17ª and opens at its other end into the interior of said ring. One of said bearing blocks is provided with an oil cup or nipple 27, adapted for connection with a high pressure gun or apparatus by which lubricant is forced not only into the ring but into all grooves and ducts before mentioned. Thus the ring which provides the connecting member for the yokes also becomes a reservoir for a lubricant for the joint as a whole with all moving parts in communication therewith.

The joint structure above described which is of especial advantage in front wheel drives for automobiles, is duplex or double in its nature in that each yoke is pivotally connected to an associated shaft section and both yokes are pivotally connected to the ring. This gives the joint as a whole not only more flexibility so that greater relative angles are possible between the shaft sections, but also gives a greater driving torque between said shaft sections without loss of power.

Figure 3:
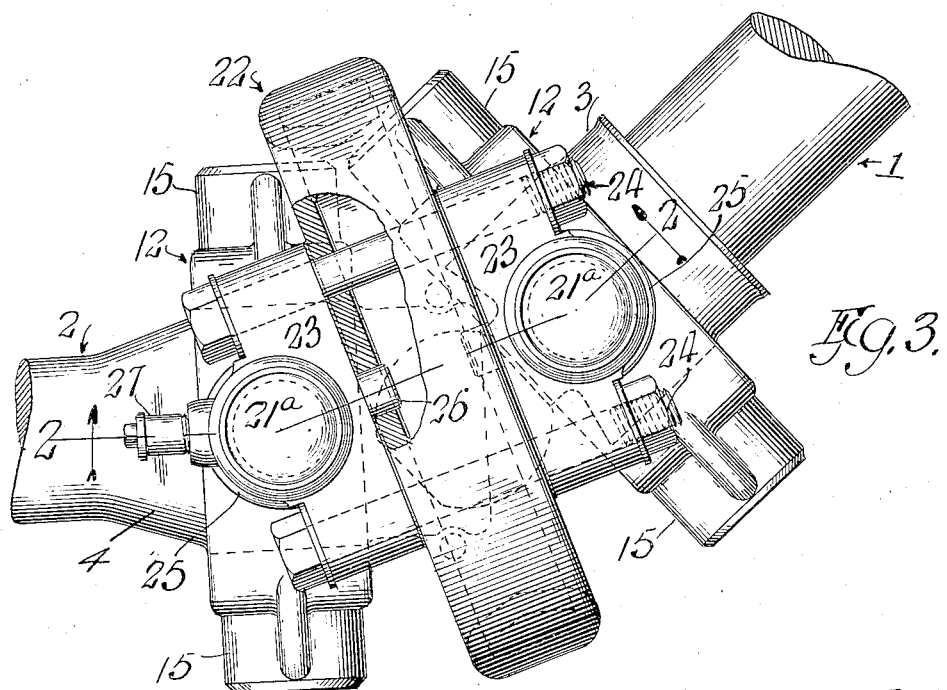
Fig. 3 is another view in side elevation of the same as revolved through a right angle from the plane shown in Fig. 1.

In Fig. 1 it will be noted that the yokes stand parallel with the ring and at less than a right angle to the associated shaft while in Fig. 3 which shows another position of the parts as when the shafts have turned about 90°, the yokes stand at a right angle to the shaft and less than a right angle to the ring.

The socket 6 is packed with lubricant in the assembly of the joint so that the joint needs no further attention so far as lubrication is concerned over a long period of time.

While in describing my invention I have referred in detail to the form, arrangement and construction of the various parts thereof, the same is to be considered as by way of illustration only so that I do not wish to be limited thereto, except as may be specifically pointed out in the appended claims.

I claim as my invention:—

1. A universal joint comprising in combination with adjacent shaft sections, a yoke pivotally connected to each shaft section in a plane at a right angle to the associated shaft section and a hollow member disposed between said yokes and to which said yokes are pivotally connected by axes disposed in a plane at a right angle to the plane of said pivotal connections between said yokes and shaft sections, there being ducts leading from said hollow member to the various pivotal connections.

2. A universal joint comprising in combination with adjacent shaft sections, a yoke associated with each shaft section and having opposed trunnions, a pintle pivotally connecting each shaft section to its associated yoke in a plane at a right angle to said shaft section, and a member disposed between said yokes and including blocks on opposite faces thereof in which the trunnions of said yokes have bearing engagement.

3. A universal joint comprising in combination with adjacent shaft sections, a yoke associated with each shaft section and having opposed trunnions, a pintle pivotally connecting each shaft section to its associated yoke in a plane at a right angle to said shaft section, a ring disposed between said yokes, pairs of blocks on opposite faces of said ring and in which the trunnions of said yokes engage and means for securing the blocks on opposite faces of the ring together and to said ring.

4. A universal joint comprising in combination with adjacent shaft sections, a yoke associated with each shaft section and having opposed trunnions, a pintle pivotally connecting each shaft section to its associated yoke in a plane at a right angle to said shaft section, a hollow ring disposed between said yokes, pairs of blocks on each side of said ring and in which the trunnions of said yokes engage and means for securing said blocks to said ring and to each other, there being ducts leading from said ring to the various pivotal connections.

5. As a part of a universal joint, a hollow ring, a pair of opposed bearing blocks on each end of said ring, with the blocks on each end of said ring having aligned bearing sleeves disposed at a right angle to the axis of said ring and bolts passing through the said ring parallel to its axis and through the bearing block on opposite ends thereof to secure said ring and blocks together, there being ducts in said blocks connecting said sleeve with the interior of said hollow ring.

6. A universal joint comprising in combination with adjacent shaft sections, means providing a ball and socket connection between the extremities of said shaft sections, a hollow ring like member encompassing said connection and disposed substantially in a plane passing through said connection and means providing two pivotal connections between said member and each shaft section, with the axis of one connection disposed at a right angle to that of the other, there being ducts connecting each of said pivotal connections with the interior of said member.

7. A universal joint comprising in combination with adjacent shaft sections having their extremities formed to provide a single ball and socket connection, a pintle extending transversely through each shaft section, a yoke pivotally connected to each shaft section by means of one of said pintles and a member between said yokes and to which said yokes are pivotally connected in planes at an angle to said pintles, said ball and socket connection providing a mutual support for the shaft ends independent of said member between said yokes and forming that joint about which said shafts swing in changing their relative angularities.

8. A universal joint comprising in combination with adjacent shaft sections, means providing a socket in one shaft section end and a ball on the other shaft section end, engaged in said socket, a pintle extending transversely through each shaft section, a yoke pivotally connected to each shaft section by means of the associated pintle and a member between said yokes and to which they are pivotally connected in planes at a right angle to said pintles.

9. A universal joint comprising in combination with adjacent shaft sections, means providing a ball and socket engagement between the associated extremities of said shaft sections, a pintle extending transversely through each shaft section and having ends extending laterally beyond the sides of the associated shaft sections, a yoke for each shaft section and engaged with said ends of the associated pintle for a pivotal connection to the associated shaft section, a ring-like means disposed between said yokes and means providing a pivotal connection between both yokes and said ring-like member, the pivotal axes of said connections between said yokes and ring-like member being disposed at a right angle to the axes of said pintles.

10. A universal joint comprising in combination with adjacent shaft sections, means providing a ball and socket engagement between the associated extremities of said shaft sections, a ring-like member surrounding said means providing said ball and socket engagement, means providing two pivotal connections between each shaft section and each side of said ring-like member and one of said pivotal connections for each side of said ring comprising a pintle extending through the associated shaft section, said last mentioned pivotal connection of each side of the ring-like member being disposed in a plane at a right angle to the other pivotal connection between each side of said ring-like member and said associated shaft section.

In testimony whereof, I have hereunto set my hand, this 16th day of August, 1928.

CORNELIUS W. VAN RANST.